W. F. D. ACKERMANN.
DEVICE FOR CANDLING, HANDLING, AND SORTING EGGS.
APPLICATION FILED NOV. 26, 1918.
1,305,861.
Patented June 3, 1919.
2 SHEETS—SHEET 1.
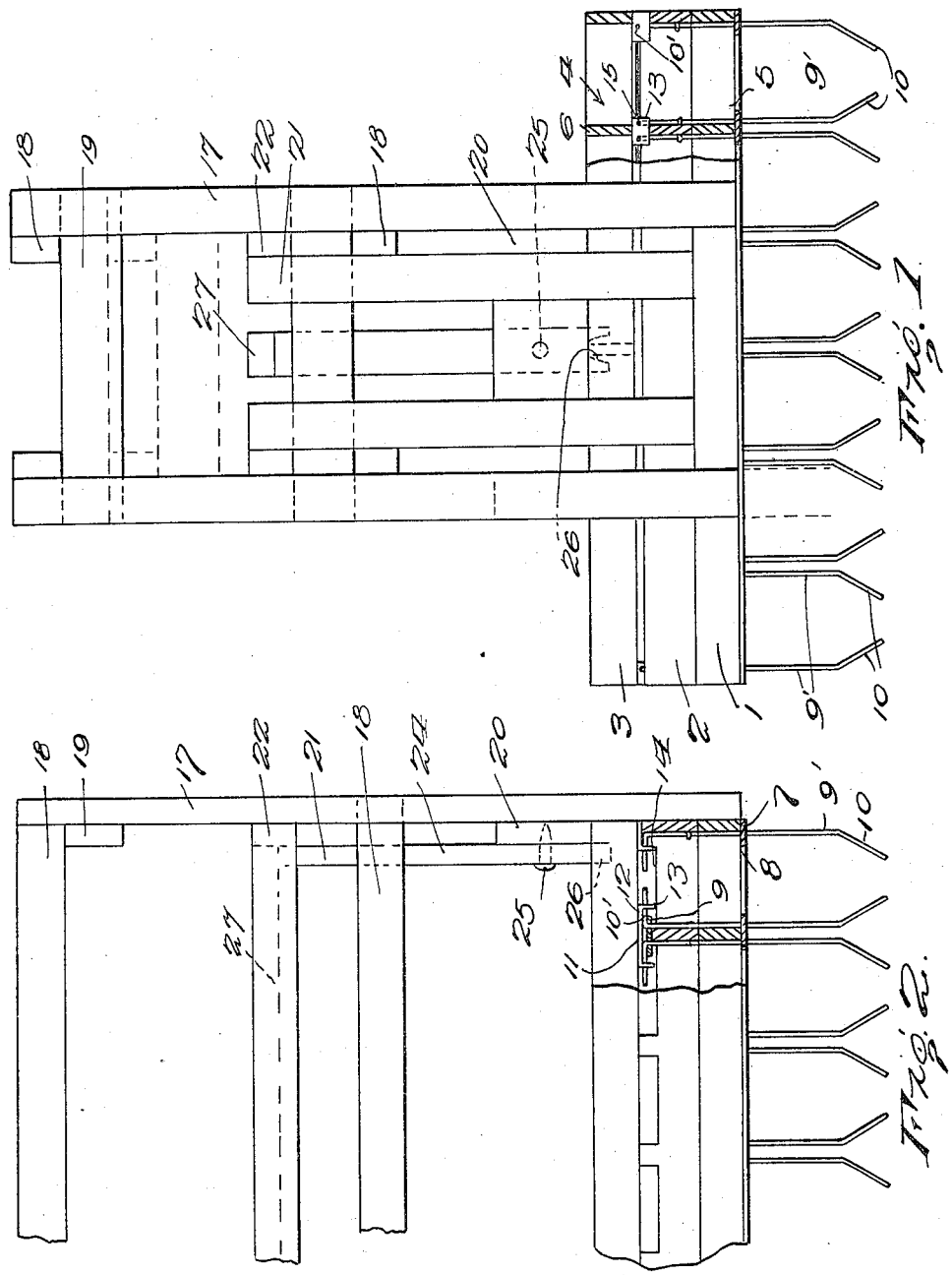

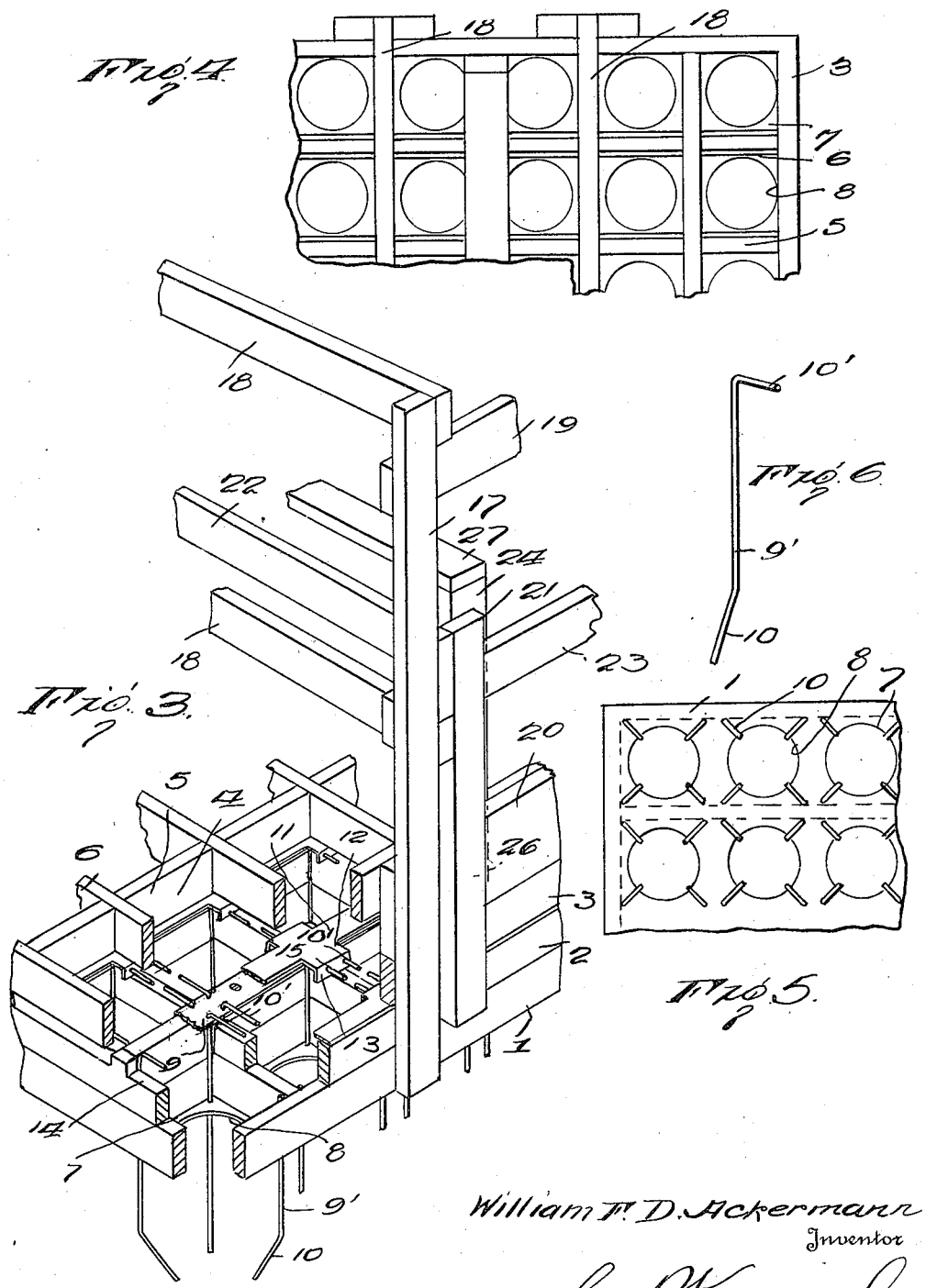

UNITED STATES PATENT OFFICE.

WILLIAM F. D. ACKERMANN, OF KAYLOR, SOUTH DAKOTA.

DEVICE FOR CANDLING, HANDLING, AND SORTING EGGS.

1,305,861. Specification of Letters Patent. Patented June 3, 1919.

Application filed November 26, 1918. Serial No. 264,266.

*To all whom it may concern:*

Be it known that I, WILLIAM F. D. ACKERMANN, a citizen of the United States, residing at Kaylor, in the county of Hutchinson and State of South Dakota, have invented certain new and useful Improvements in Devices for Candling, Handling, and Sorting Eggs, of which the following is a specification.

The present invention comprehends generally improvements in that class of inventions known as preserving and more particularly relates to a device for candling, handling and sorting eggs.

It is the primary aim and object of the present invention to provide a device of the above mentioned character designed to be set and arranged over an egg case and successively operated, first, arranged to the sides of the eggs in the upper filler and subsequently operated so that certain parts will be arranged beneath the eggs to insure of the removal of the eggs from the case so that the eggs may be candled, handled and sorted before the operation of the device is reversed for the placing of the eggs in another case, the egg receiving means incidentally being constructed so that pressure is not exerted against the eggs, thereby preventing cracking and breaking of the eggs during the use of the device.

More particularly the present invention embraces the provision of a device of the above mentioned character embodying a plurality of superposed and relatively movable frames manually operable independently of each other to insure of the reception and retention of the eggs in the device, one of the frames being movable vertically beneath the intermediate frame while the upper frame is shiftable across the intermediate frame to insure of the proper positioning and operation of the elements forming the egg receivers.

It is a more specific object of this invention to provide a device of the above mentioned character wherein certain of the actuating handles are designed to act as supporting legs when the device is inverted to facilitate candling, handling and sorting of the eggs subsequent to the removal of the eggs from the case; and to also provide improved means for mounting and operating the egg receiving wires.

Among the other aims and objects of the present invention may be recited the provision of a device of the above mentioned character wherein the number of parts are comparatively few, the construction simple, the cost of production low and the efficiency high.

With these and other objects in view, the invention accordingly consists in the novel features of construction, combination and arrangement of parts as will be hereinafter referred to and more particularly pointed out in the specification and claims.

The invention is clearly illustrated in the accompanying drawings, in which:

Figure 1 is a front end elevational view of the device, partly in section, the parts being shown in a set position with the egg wires positioned so that they may be arranged about the eggs in the upper filler of an egg case, not shown, Fig. 2 is a fragmentary side elevational view of the device, partly in section, Fig. 3 is a perspective detail of a part broken away to indicate the details of construction thereof, Fig. 4 is a fragmentary top plan view of the device, Fig. 5 is a fragmentary bottom plan view of the device, and Fig. 6 is a perspective detail of one of the wires forming a part of the egg receivers and retainers.

Similar characters of reference are employed in all of the above described views, to indicate corresponding parts.

Referring now, more particularly, to the accompanying drawings, there is provided a plurality of frames, 1, 2 and 3 arranged in superposed relation with respect to each other and desirably of a rectangular configuration and these frames are provided with alining cells 4 formed by the longitudinally extending and spaced parallel strips 5 and the transversely extending and spaced parallel strips 6 which intersect the longitudinal strips 5. These cells 4 form part of the egg receivers while the lower frame 1 has attached to the under surface thereof a plate 7 which is provided with a plurality of circular openings 8 which aline with the cells 4 while disposed at the inner corners at each of the cells and rockably mounted in brackets 9 on the intermediate frame are opposed pairs of rods 9' forming parts of the egg receivers, the lower portions being bent at an inclination relative to the main portion as indicated at 10 to provide retainers.

In operatively mounting the upper portions of these rods in the device so that they will be rocked to lie parallel with the strips 5 and 6 or diagonally of the cells 4 when the upper frame is shifted longitudinally, a plurality of metal strips 11 are provided and are secured to the under surfaces of the strips 5 in the upper frame 3 being formed at points beneath the transverse strip 6 with opposed pairs of wings 12, the outer portions of which are bent downwardly to provide flanges 13 which are accommodated within and on the recessed upper edges 14 of the transverse strips 6 of the intermediate frame 2 and in addition are provided with spaced openings 15 which lie on opposite sides of the strips 5 and have journaled therein the right angularly bent upper mounting portion 10' of the rods. By this arrangement it will be apparent that when the upper frame 3 is shifted longitudinally the upper portions which are engaged in the flanges will be turned to rock the rods so as to arrange the retaining portions 10 either parallel with the strips 5 and 6 or diagonally of the cells 4, the latter position being shown in Fig. 3.

In order to operate the frames and facilitate the handling of the device in its entirety, spaced standards 17 are connected to the opposing sides of the frame 1 and the opposing standards are connected to each other by transversely extending handle bars 18 while the adjacent standards are connected by the upper brace bars 19 and the lower brace bars 20 which are positioned so that when the handle bars are moved upwardly as high as possible they coöperate with the standards in maintaining the frames in superposed and contacting relation as indicated in Fig. 3. Spaced standards 21 are connected to the sides of the intermediate frame at their lower ends and are positioned adjacent the inner sides of the standards 17 and the opposing standards 21 are connected at their upper ends by transverse handle bars 22 which lie beneath the upper handle bars 18 to coöperate therewith in a manner which will hereinafter become apparent. In addition, the standards 21 are braced relative to each other by longitudinally extending braces 23, the respective ends of which project beyond the standards and lie between the lower handle bars 18 and the bars 22 for the standards 21. In order to shift the upper frames, opposed levers 24 are swingably connected as by fasteners 25 near their lower ends, the extreme lower ends of the levers being bifurcated as at 26 to provide spaced arms which are straddled about the adjacent transverse strip 6 in the upper frame 3. The upper ends of the levers are connected by an operating handle or cross bar 27 to facilitate rocking of the levers simultaneously so as to shift the frames longitudinally to consequently rock the rods 9' so that they will lie either parallel with or diagonally of the cells.

In use, it is first necessary to see that the cross arm 22 is pushed down against the brace 23 and that the retaining portions 10 of the rods 9' are in a position parallel with the sides of the cells so that the entire device may be placed over eggs in a filler case (not shown) and pushed down until the lower frame 1 touches the top of the fillers or until the bottoms of the projecting rods strike the next filler, and in the meantime shaking the entire device slightly, if necessary, to prevent jamming of the eggs. The levers 24 are now swung so as to shift the upper frame and in consequence partially rotate the rods 9' so that the retaining portions will be arranged diagonally of and beneath the cells and also beneath the eggs in the fillers. The device is now lifted upwardly removing the eggs and the upper fillers from the case whereupon a strong light is used to candle the eggs and the bad eggs marked by a pencil or the like. If desired, the machine may be turned up side down and the standards 17 and cross bar handles 18 used as a support for the device when in inverted position, the eggs of course resting on the plate 7, as is apparent. If there are any bad eggs in the device the levers 24 are shifted to move the rods into open position so that the bad eggs may be removed, the machine or device being subsequently arranged in an upright position and placed inside of another case not shown which will be filled with the good eggs. In order that the good eggs may be properly placed in a new case (not shown) the levers 24 are swung so as to arrange the rods in an open position whereupon the upper handle cross bar 18 and the cross bar handle 22 of the intermediate frame are grasped and drawn together until the cross bar handle 22 strikes the brace 19, this action forcing the lower frame downwardly beneath the intermediate frame and at the same time pushes the eggs as well as the fillers clear of the rods. To insure of the removal of the filler it is only necessary to move the lever a slight extent toward a closed position and shake the device slightly so that said filler will fall therefrom into the case. The device can now be removed from the case and the machine reset so that the operation may be repeated for the next layer of eggs.

It is believed in view of the foregoing description that a further detailed description of the operation of the invention is entirely unnecessary. Likewise, it is believed that the advantages of the invention will be readily apparent.

Having thus fully described the invention, what is claimed as new and desired to be secured by Letters Patent, is:

1. A device of the character described including a plurality of superposed frames provided with alining cells, a plate secured to the lower frame and provided with openings alining with the cells, rods arranged in the corners of the cells and rockably mounted in the intermediate frame and having the lower ends of their depending portions bent to form retaining portions for coöperating with the openings in the plate, means for operably connecting the upper ends of the rods to the upper frame, and means for shifting the upper frame to actuate the rods.

2. A device of the character described including a plurality of superposed frames provided with alining cells, a plate secured to the under surface of the lower frame and provided with openings alining with the cells, vertically disposed rods arranged in the corners of these cells and rockably mounted in the intermediate frame, the lower portions of the rods depending from the lower frame when the frames are in contacting relation, the lower ends of the lower portions of the rods being bent to form retaining portions for coöperating with the openings, means for operably connecting the upper ends of the rods with the upper frame, means for shifting the upper frame to actuate the rods, and means for moving the lower frame independently of and beneath the intermediate frame.

3. A device of the character described including a plurality of superposed frames provided with alining cells, a plate secured to the lower frame and provided with a plurality of openings alining with the cells, rods arranged in the corners of the cells and rockably mounted in the intermediate frame, the lower portions of the rods depending from the lower frame when the frames are in contacting relation, the lower portions of the rods being bent angularly to form retaining portions for coöperating with the openings in the plate, the upper portions of the rods being also bent angularly, means on the upper frame for operably receiving the bent upper ends of the rods so as to partially rotate the rods when the upper frame is shifted, means for shifting the upper frame to consequently actuate the rods, and means for moving the lower frame downwardly independently of the intermediate frame.

4. A device of the character described including a plurality of superposed frames provided with alining cells, a plate secured to the under surface of the lower frame and provided with a plurality of openings alining with the cells, vertically disposed rods arranged in the corners of the cells and rockably mounted in the intermediate frame having the lower ends bent to form retaining portions for coöperating with the openings and the upper ends bent to provide mounting portions, means on the under surface of the upper frame for operably receiving the mounting portions of the rods, handles connected to the lower and intermediate frames for manipulating the device and for moving the lower frame downwardly relative to the intermediate frame at times, pivoted levers operably connected to the upper frame for shifting the upper frame to consequently operate the rods.

5. A device of the character described including a plurality of frames, the upper of which is shiftable while the lower is movable downwardly relative to the intermediate frame, the frames being provided with alining cells, vertically disposed rods arranged in the corners of the cells in the frame and rockably mounted in the corners of the cells of the intermediate frame and having their lower portions bent to provide retaining portions and having their upper ends bent to provide mounting portions, means on the upper frame for operably receiving the mounting portions of the rods so that when the upper frame is shifted the rods will be rocked so as to arrange the retaining portions either parallel with the sides of the cells or diagonally of the cells.

6. A device of the character described including a plurality of superposed frames having alining openings therein, the upper frame being shiftable longitudinally of the intermediate frame while the lower frame is movable toward and from the bottom of the intermediate frame, a plate secured to the under surface of the lower frame and provided with openings alining with the cells, rods arranged in the corners of the cells in the frames and rockably mounted at the corners of the cells of the intermediate frame having their lower ends bent to provide retaining portions for coöperating with the openings in the plate and having the upper ends bent to provide mounting portions, longitudinally extending strips secured to the under surface of the upper frame and provided with a plurality of opposed pairs of wings, flanges formed at the terminals of the wings and provided with openings for operably receiving the mounting portions of the rods so that when the upper frame is shifted the retaining portions of the rods will be arranged either parallel with the sides of the cells or diagonally of the cells.

In testimony whereof, I affix my signature hereto.

WILLIAM F. D. ACKERMANN.